(12) United States Patent
Natori et al.

(10) Patent No.: US 7,228,142 B2
(45) Date of Patent: Jun. 5, 2007

(54) COMMUNICATION TERMINAL APPARATUS AND COMMUNICATION SYSTEM

(75) Inventors: Makoto Natori, Saitama (JP); Katsutoshi Itoh, Tokyo (JP); Mitsuyoshi Yasuda, Tokyo (JP); Osamu Yoshimura, Kanagawa (JP); Minoru Yokoshi, Tokyo (JP); Takeshi Itagaki, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 65 days.

(21) Appl. No.: 11/170,675

(22) Filed: Jun. 29, 2005

(65) Prior Publication Data

US 2006/0003776 A1 Jan. 5, 2006

(30) Foreign Application Priority Data

Jun. 30, 2004 (JP) ............................ P2004-195061

(51) Int. Cl.
*H04Q 7/20* (2006.01)
(52) U.S. Cl. .................. 455/456.3; 455/41.2; 455/410; 455/411; 455/41.3
(58) Field of Classification Search ............. 455/456.3, 455/41.2, 410, 411, 41.3
See application file for complete search history.

(56) References Cited

U.S. PATENT DOCUMENTS 6,961,541 B2 * 11/2005 Overy et al. ................ 455/41.2

2001/0007817 A1 7/2001 Odagiri et al.

FOREIGN PATENT DOCUMENTS

DE 101 55 809 5/2003

OTHER PUBLICATIONS

Patent Abstracts of Japan, vol. 2002, No. 04, Aug. 4, 2002 & JP 2001 358827 A (Mitsubishi Electric Corp), Dec. 26, 2001.
Patent Abstract of Japan, vol. 2002, No. 04, Aug. 4, 2002 & JP 2001 352579 A (NEC Corp), Dec. 21, 2001.

* cited by examiner

*Primary Examiner*—Joseph Feild
*Assistant Examiner*—David Q. Nguyen
(74) *Attorney, Agent, or Firm*—Frommer Lawrence & Haug LLP; William S. Frommer; Thomas F. Presson (57) ABSTRACT

According to the present invention makes, even if two of mobile communication terminal apparatuses such as a wireless key apparatus and a mobile telephone terminal apparatus or the like are utilized in various possessing states, it is made possible to maintain a stable distance detection accuracy. In a communication apparatus in which A distance to a connection partner terminal is detected according to a certain parameter and in a case when the distance exceeds a predetermined value, a function limitation or notification to a user is carried out, it is identified that the two of the mobile communication terminals lie in a predetermined appropriate distance according to a manual or automatic method and the proper distance identification information and further receiving state and transmission power at that time if they are necessary are communicated mutually and a parameter used for a distance detection is adjusted.

5 Claims, 9 Drawing Sheets

COMMUNICATION TERMINAL APPARATUS AND COMMUNICATION SYSTEM

CROSS REFERENCES TO RELATED APPLICATIONS

The present invention contains has recognized/(object) matter related to Japanese Patent Application JP 2004-195061 filed in the Japanese Patent Office on Jun. 30, 2004, the entire contents of which being incorporated herein by reference.

BACKGROUND OF THE INVENTION

1. Field of the Invention

The present invention relate, for example, to a communication system constituted by a communication terminal apparatus such as a mobile telephone terminal or a wireless key apparatus restricting the operation of the mobile telephone terminal and to a communication terminal apparatus constituting the communication system.

2. Description of the Related Art

In recent years, a mobile telephone terminal which is one of communication terminal apparatuses a user always taking along in possession has a trend such that various functions other than wireless telephone functions of primary functions are built-in so as to contain multi functions.

For example, there exists such a terminal in which a camera function carrying out a filming of a still picture and a moving picture, a recording and reproducing function of music data, a viewing and listening function of television broadcast or the like is built-in.

In addition, there has been developed a mobile telephone. terminal in which a function as a non-contacting IC card which has been prevailing rapidly in recent years is built-in. This non-contacting IC card is utilized as a boarding ticket of transport facilities, a membership card, an employee ID card, a card for price settlement means at a shop or the like where an authentication process is carried out by performing wireless communication between adjacent reader and writer, so that it is easy-to-use as compared with a magnetic card or the like. It should be noted in a case when an IC card function unit is mounted in a mobile terminal that the IC card function unit is not always necessarily to have a card type shape.

And now, it is preferable for the mobile telephone terminal having multi functions in this manner to be carried out with a process in order to secure some kind or another security for preventing various functions provided in the terminal from being abused when the terminal is lost. In particular, utilization in personal authentication, settlement or the like is assumed in case of a terminal equipped with an IC card function and there is a dangerous possibility that personal information stored in a memory of an IC chip is read out unjustly or unjust settlement or the like is carried out, so that the necessity for a function for is preventing the unjust use thereof is high. There are descriptions, for example, in Japanese Jap. laid-open patent publication No. 2001-352579 or No. 2001-358827 that a wireless card which forms a pair with respect to the mobile telephone terminal is prepared and authentication request is wireless-transmitted periodically from that wireless card such that the functions of mobile telephone terminal is made to be restricted in a case when collation with respect to the authentication request cannot be taken.

More specifically, in a case when the mobile telephone terminal and the wireless card exchange ID (identification information) inherent therein periodically and a favorable communication state is maintained, that is, in a case when the ID exchange is realized, the mobile telephone terminal carries out a normal operation. On the contrary, when it is a state where the ID cannot be exchanged, that is, when the communication state is deteriorated or the communication is cut off, the use of partial function in the mobile telephone terminal is to be limited. In other words, it is possible to execute function limitation after presuming a distance between the mobile telephone terminal and the wireless card by utilizing wireless communication characteristics such that a favorable communication is possible when communication distance between the mobile telephone terminal and the wireless card is short and the communication state becomes deteriorated when the communication distance becomes long.

SUMMARY OF THE INVENTION

The apparatus described in Jap. laid-open patent publication No. 2001-352579 or No. 2001-358827 shows a constitution in which a function limitation or the like is executed by utilizing the detection of the wireless communication state, but there is a problem caused by the usage of the wireless communication such that the detected distance may not become stable according to a change of the communication environment. For this reason, there are pointed out factors described hereinafter as examples thereof.

First, since data volume to be handled has been increasing caused by fullness of contents or the like, wireless frequency band used for a communication has become larger such, for example, that 2.4 GHz band is used for a communication in Bluetooth® which is becoming popular as a short distance wireless communication standard. The wireless signal of such a high frequency band is easily influenced by a shielding object. In particular, since it is near the resonance frequency of water, power thereof is largely attenuated according to a shield such as a human body which includes a lot of water.

In addition, characteristic of an antenna used for the communication cannot be uniform for all directions either and received power or receiving quality under a situation away by a constant distance is to fluctuate according to environment, apparatus setting situation or the like of the wireless key, the mobile telephone terminal or the like. Based on such a situation, a structure carrying out correction for making the detection distance constant is to be desired.

In view of such matters, the present invention has recognized that even if two communication terminal apparatuses out of, for example, a mobile telephone terminal, a wireless key and the like are utilized in various possessing situations, it can be made possible to detect those by a constant distance.

In order to solve aforementioned problems and to achieve the recognition, the present invention is a system which detects distance between first and second communication terminal apparatuses and in a case when the distance exceeds a predetermined value, a predetermined function of either of first or second predetermined communication terminal apparatus is limited and/or the fact thereof is notifies to a user in which each of the first and second communication terminal apparatuses is provided with an operation unit, communication means for performing a wireless communication with a connection partner apparatus by a predetermined wireless communication system, distance detection means for performing a distance detection in response to a parameter relating to the distance detection with respect to the connection partner apparatus, proper distance recognition means for obtaining information signal showing a fact that the distance with respect to the connection partner apparatus is a predetermined proper distance and for recognizing that it is a proper distance from the connection partner apparatus, and adjustment means for adjusting the parameter value in the predetermined distance in response to aforementioned parameter value when the proper distance is recognized by the proper distance recognition means and the reference value of the parameter in a proper distance, wherein the parameter adjustment is carried out in the first and second communication terminal apparatuses based on the fact that the proper distance recognition means recognizes the proper distance and the proper distance recognition information is transmitted to the connection partner apparatus after a predetermined operation to the operation unit by a user with respect to the first or second communication terminal apparatus.

According to such an invention as the present invention, the fluctuation of the distance detection accuracy can be improved when the first and second communication terminal apparatuses, for example, mutually share information of the proper distance recognition when they are in an extremely short distance and a favorable connection state is maintained and the parameter relating to the distance detection in both of the communication terminal apparatuses is adjusted based on that information. Also, the proper distance recognition process can be realized simply, for example, by a simple manual operation in an actual operation by a user or by an automatic operation after judging stability of the receiving state subsequent to a predetermined time after an ordinary use.

Also, in a parameter adjustment relating to a distance detection after the proper distance recognition of the present invention, if it is constituted such that a wireless state of the communication terminal apparatus when recognizing a proper distance is communicated so as to calculate bidirectional propagation loss of the reception and transmission, an error judgment of the receiving strength is carried out and as a result of the judgment, a re-measurement is promoted if necessary, there is an effect that it is possible to purpose an improvement in accuracy of the parameter adjustment.

DESCRIPTION OF THE PREFERRED EMBODIMENTS

Hereinafter, an example of one embodiment of the present invention will be explained with reference to FIGS. 1 to 7.

In the present invention, a wireless key apparatus carrying out a wireless communication with a mobile telephone terminal apparatus is prepared and it is constituted such that security lock of the mobile telephone terminal apparatus is to be carried out according to a wireless communication state of the both sides.

Figure 1:
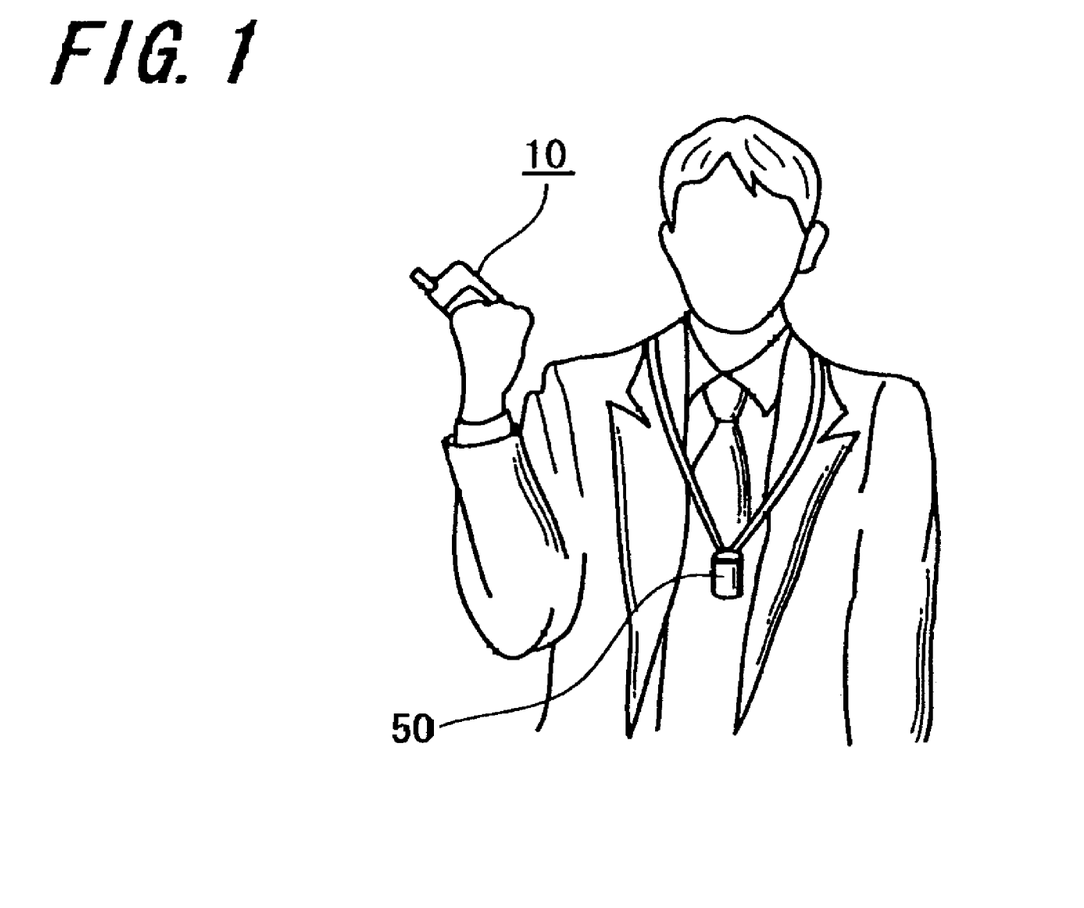
FIG. 1 is a perspective view showing a system constitutional example according to one exemplified embodiment of the present invention.

FIG. 1 is a diagram showing a usage example of an apparatus of the present invention. A wireless key apparatus 1 which has a body separated from a mobile telephone terminal apparatus 50 is prepared. In this example, the wireless key apparatus 1 is constituted in a smaller size than the mobile telephone terminal apparatus 50 and it is constituted, for example, to have a small sized shape such that a user can always carry it by hanging it down from the neck of the user by a neck strap or the like. The wireless key apparatus 1 is constituted such that a light emitting unit (display unit) and an operation unit of push buttons or the like are arranged thereon.

Figure 2:
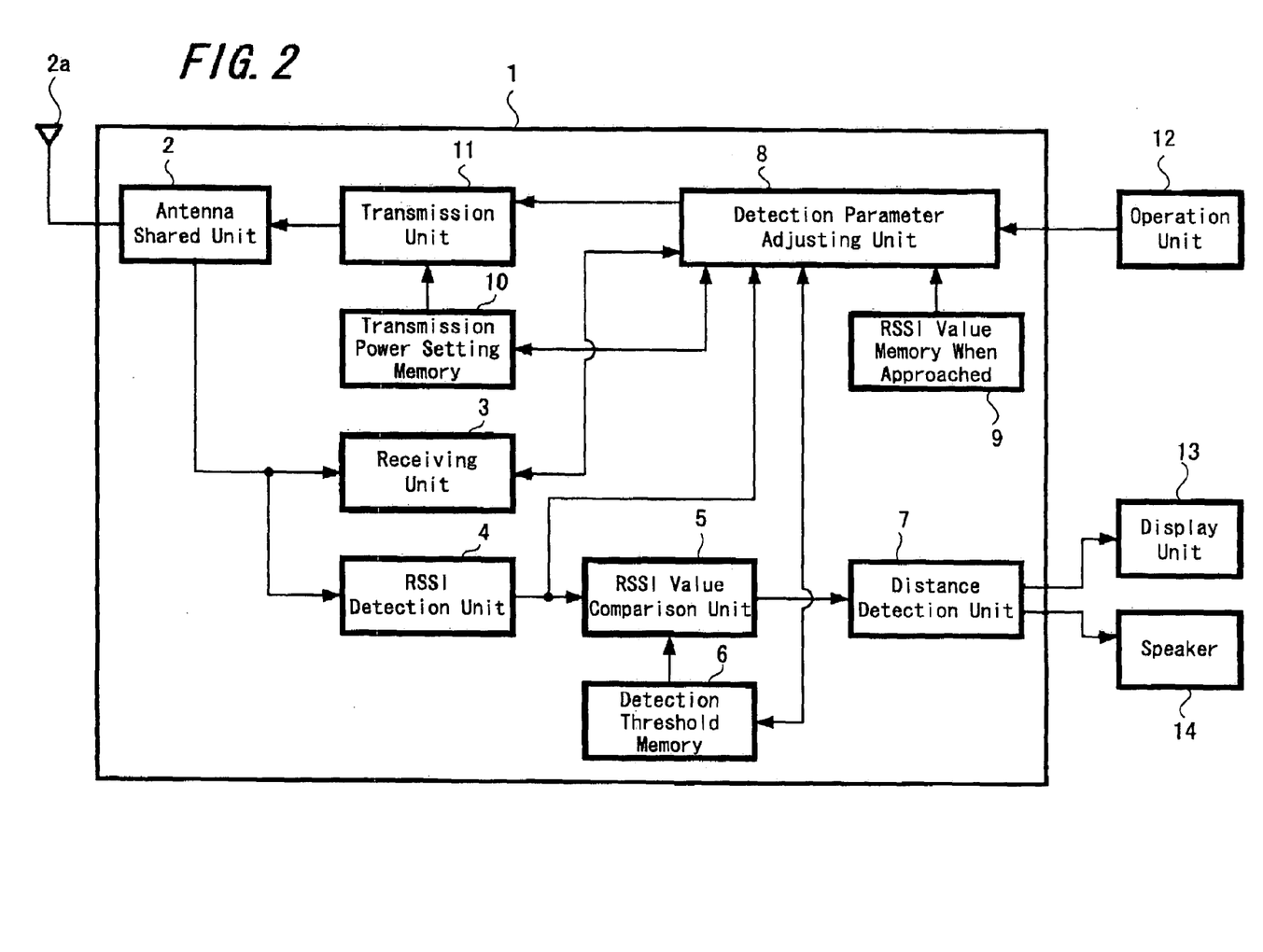
FIG. 2 is a function block diagram of a wireless key and a mobile telephone terminal using RSSI reception level detection according to one exemplified embodiment of the present invention.

Next, it will be explained with respect to a constitution of the wireless key apparatus 1 which carries out a wireless communication with the mobile telephone terminal apparatus 50 of the present invention with reference to FIG. 2. FIG. 2 shows a function block diagram of the wireless key apparatus 1 using RSSI (Received Signal Strength Indicator; receiving signal strength display) signal level detection. The function block shown in FIG. 2 is constituted by an antenna sharing unit 2, an antenna 2a, a receiving unit 3, an RSSI detection unit 4, an RSSI value comparison unit 5, a detection threshold memory 6, a distance detection unit 7, a detection parameter adjustment unit 8, a memory 9 of RSSI value when adjacent, a transmission power setting value memory 10, a transmission unit 11 and an operation unit 12.

The mobile telephone terminal apparatus 50 includes such as communication means for a telephone communication carrying out a wireless communication for a telephone communication with a predetermined base station and a telephone communication system of such as microphone and sound processing means or the like in addition to these function blocks wherein it is possible with respect to the security structure relating to the present invention to show it by a similar constitution as that of FIG. 2, so that individual explanations thereof will be omitted.

In FIG. 2, antenna sharing unit 2 separates the transmission circuit and the receiving circuit favorably, receives a receiving signal by way of the antenna 2a and at the same time transmits a transmission signal to the antenna 2a so as to outputs it externally. The receiving unit 3 transmits a receiving signal received from the antenna sharing unit 2 to the detection parameter adjustment unit 8. These receiving unit 3 and transmission unit 11 can carry out a wireless communication in a short distance and carry out a wireless communication with a partner in a relatively narrow region, for example, from around several meters to hundred meters at the maximum bay way of the antenna sharing unit 2 (However, it is constituted when a communication is carried out in a normal period with a wireless key apparatus which will be described later on such that a process for narrowing the communication possible region is to be executed). Here, it is constituted, for example, such that a wireless communication system for a short distance referred to as Bluetooth® is to be applied.

According to the short distance wireless communication of this Bluetooth system, various kinds of usage applications are supposed, for example, for the mobile telephone terminal apparatus 50 such that a communication with a head set for a hands-free telephone call is carried out or by carrying out a with a communication with a personal computer apparatus, a data communication from the computer apparatus is carried by way of the mobile telephone terminal apparatus 50. With respect to the frequency band used in the wireless communication, for example, a 2 GHz band is used and it is constituted such that a frequency band or a modulation system which does not intervene in the wireless telephone communication of the mobile telephone terminal apparatus 50 is to be used and it becomes possible to carry out a wireless telephone communication and a communication in the receiving unit 3 and the transmission unit 11 for a short distance wireless communication concurrently.

In case of the present invention, a wireless communication is carried out with the mobile telephone terminal apparatus 50 by using the receiving unit 3 and the transmission unit 11 for this short distance communication. However, it is possible for the mobile telephone terminal apparatus 50 also to have a wireless communication with an apparatus other than the wireless key apparatus 1 (head set, personal computer apparatus or the like) if it is a communication apparatus of the same communication system. Also, in a case when a security function is executed, the wireless key apparatus 1 carrying out a wireless communication by the receiving unit 3 and the transmission unit 11 is limited to a specific one apparatus and the identification ID of that apparatus or the like is to be registered in a memory (drawing abbreviated) or the like beforehand. It may be constituted with respect to the registered information relating to the wireless key apparatus 1 such that a user cannot revise it.

Also, the RSSI detection unit 4 detects the RSSI value (unit is [dBm], [dB] or the like) from the receiving signal of the antenna sharing unit 2, and the detected result is inputted to the RSSI value comparison unit 5 and at the same time is inputted to the detection parameter adjustment unit 8. The RSSI value comparison unit 5 compares the RSSI value of the receiving signal inputted from the RSSI detection unit 4 and a predetermined value so as to output to the distance detection unit 7. For the predetermined value compared at that time, a distance detection threshold recoded beforehand in the detection threshold memory 6 of a non-volatile type is used.

The same result as the detected result in this distance detection unit 7 is detected similarly also in the distance detection unit on the side of the mobile telephone terminal apparatus 50 and a function limitation is carried out. More specifically, in a case when it is detected in a wireless state that the distance between the wireless key apparatus 1 and the mobile telephone terminal apparatus 50 becomes far away from a predetermined value, the mobile telephone terminal apparatus 50 limits a predetermined function (function limitation mode which will be described later on) and the wireless key apparatus 1 notifies that to a user.

It is constituted with respect to a notification method in the wireless key apparatus 1, for example, such that a message about that fact is displayed on the display unit 13 or the light emitting unit is lighted and alternatively sound is rung by the speaker 14 or vibration is generated by way of a vibration unit (drawing is abbreviated) so as to notify it. Also, if it is within a predetermined period after it is judged that the distance between the mobile telephone terminal apparatus 50 and the wireless key apparatus 1 is far, it is possible not to carry out the function limitation but to maintain a state in which only an attention is promoted to a user (warning mode which will be described later on). Further, it may be constituted such that the state mentioned above is displayed on the display unit on the side of the mobile telephone terminal apparatus 50 or the light emitting unit thereof is lighted and alternatively alarm is sounded by the speaker.

According to the fact that the operation unit 12 received an operation input from a user, the detection parameter adjustment unit 8 recognizes that the mobile telephone terminal apparatus 50 and the wireless key apparatus 1 exist, for example, in an extremely short distance and that they are in a proper distance by being maintained in a favorable connection state. Then, by a communication between the wireless key apparatus 1 and the mobile telephone terminal apparatus 50, the fact that both are in a proper distance is notified mutually with respect to the connection partner terminal. Also, if it is necessary, the wireless state (receiving RSSI value or transmission power) at that time is also notified. Then, the parameter used for distance measurement, in other words, distance detection threshold on the RSSI base in the distance detection threshold memory 6 or transmission power setting value in the transmission power setting value memory 10 is adjusted. Also, propagation loss on the wireless key apparatus 1 side (mobile telephone terminal apparatus 50 side) is calculated and parameter adjustment is carry out in consideration of its error.

The transmission unit 11 transmits a signal for transmission from the detection parameter adjustment unit 8 to the antenna sharing unit 2 by a transmission power and a transmission signal of a transmission power according to transmission power setting value recoded in the transmission power setting value memory 10 is transmitted to the partner side device by way of the antenna 2a.

Further, the memory 9 of RSSI value when adjacent is a non-volatile memory in which a reference RSSI value at a predetermined distance is recoded, which is also described later on. Also, the operation unit 12 is an operation switch of a key switch, power supply switch or the like which is provided in the mobile key apparatus 1 or the mobile telephone terminal apparatus 50.

Figure 3:
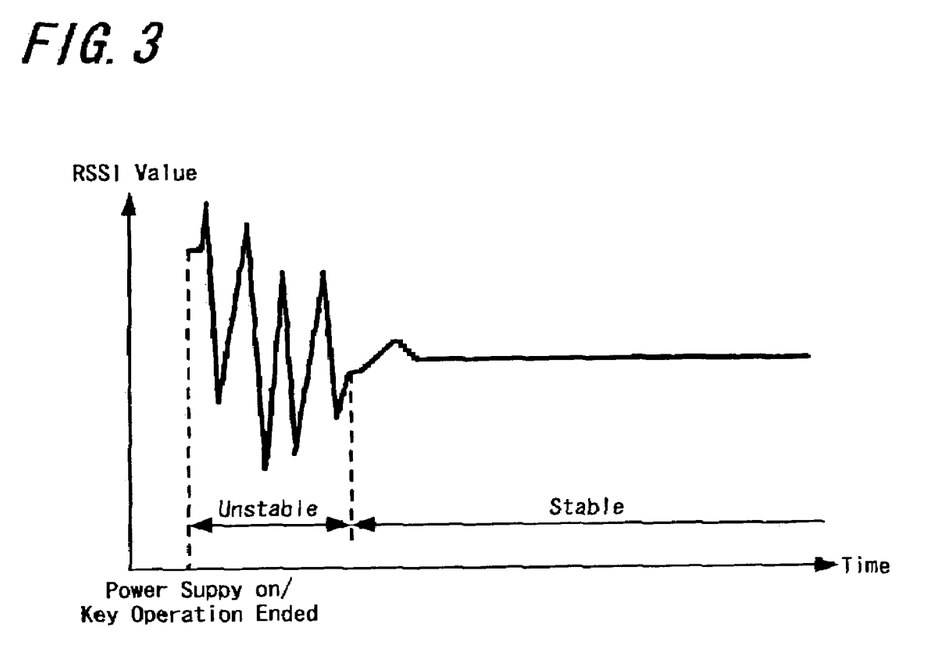
FIG. 3 is a diagram showing an example of a time change of RSSI value.

FIG. 3 is a diagram showing one example of time change of the RSSI value of the receiving signal. For example, just after a key input such as power supply ON according to signal transmitting and receiving or the like or completion of E-mail transmission and reception or the like is operated, the receiving RSSI value is very unstable as shown in FIG. 3 the receiving RSSI value becomes stable after a certain period elapsed. The more unstable the receiving RSSI value, the bigger the error of the propagation loss which will be described later on becomes and the distance detection accuracy fluctuates. Consequently, since it is important that the receiving RSSI value becomes stable for an accuracy parameter adjustment, it is constituted in the RSSI detection unit 4 such that a stable receiving RSSI value is to be detected by utilizing a receiving signal when a predetermined time period elapses after a user operation which will be described later on.

Next, it will be explained with respect to a process example in a case when a security process is carried out after preparing the mobile telephone terminal apparatus 50 and the wireless key apparatus 1 of such a constitution.

First, it will be explained with reference to FIG. 4 with respect to a security process mode (hereinafter designates as security process mode). It is constituted in case of this example such that there are prepared a normal mode M1 which does not limit the function of the mobile telephone terminal apparatus 50, a warning mode M2 for warning that it gets out of the normal mode caused by a fact that the distance between the mobile telephone terminal apparatus 50 and the wireless key apparatus 1 goes away or the like and a function limitation mode M3 for limiting the function of the mobile telephone terminal apparatus 50 in a case when it does not return to from the warning mode to the normal mode (more specifically, in a case when the distance between the mobile telephone terminal apparatus 50 and the wireless key apparatus 1 remains in a far state).

Figure 4:
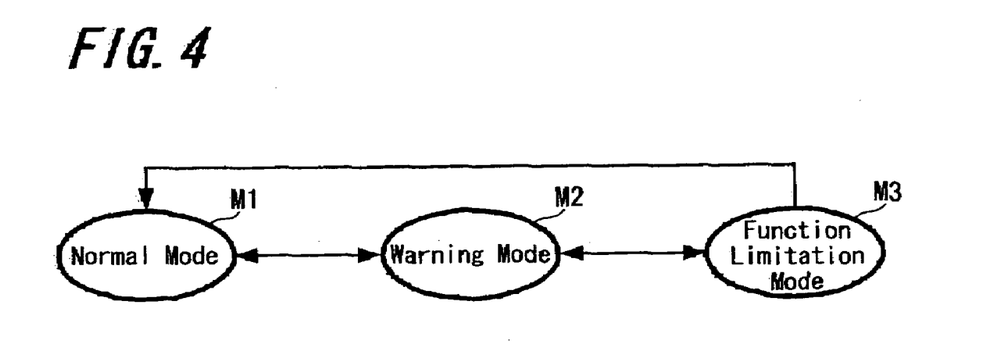
FIG. 4 is an explanatory diagram showing a setting example of a security mode according to one exemplified embodiment of the present invention.

With respect to the transition of these modes, there are, as shown by arrows in FIG. 4, a change from the normal mode M1 to the warning mode M2 and a change from the warning mode M2 to the function limitation mode M3 and further, it returns to the normal mode M1 if the wireless key apparatus 1 approaches the mobile telephone terminal apparatus 50 in a state in which it became the function limitation mode M3. Further, it returns to the normal mode M1 if the wireless key apparatus 1 approaches the mobile telephone terminal apparatus 50 in a state in which it became the warning mode M2 and the warning operation is carried out.

Figure 5:
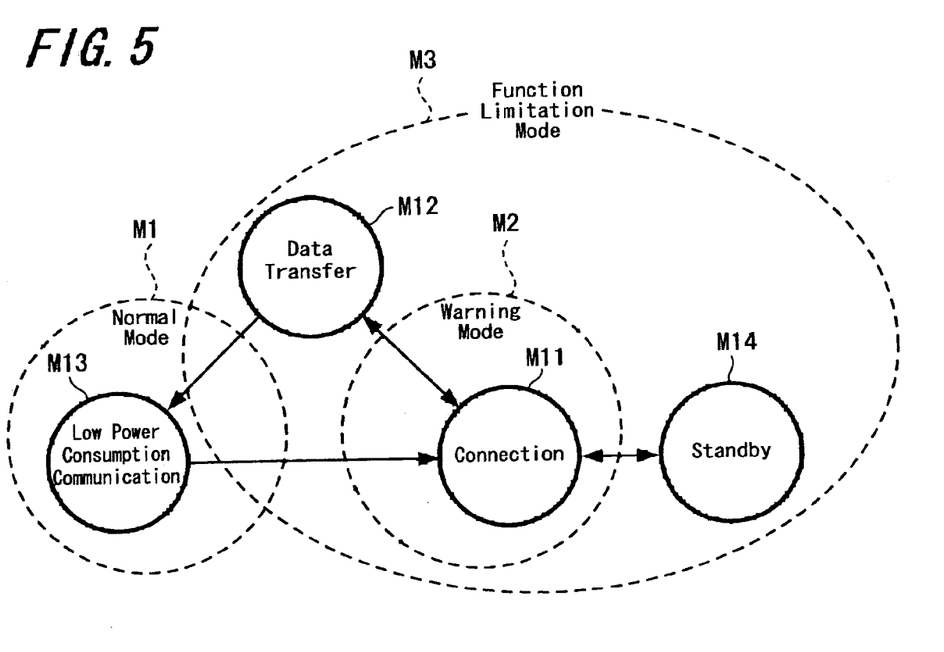
FIG. 5 is an explanatory diagram showing a transition example of a security mode by a communication mode according to one exemplified embodiment of the present invention.

In case of the present invention, these security modes are made to have a relation with communication modes prepared in the Bluetooth system which is a wireless communication system between the mobile telephone terminal apparatus 50 and the wireless key apparatus 1. More specifically, the communication mode s in the wireless communication system (Bluetooth system) of the present invention is shown in FIG. 5, wherein there is a connection mode M11 in which a partner apparatus is authenticated so as to be wireless-connected on both sides of the mobile telephone terminal apparatus 50 and the wireless key apparatus 1 and when the authentication is mutually completed in the connection mode M11 and a connection is carried out, it becomes a data transfer mode M12 in which payload data transfer is carried out practically. When the data transfer is completed in the data transfer mode M12, it is shifted to a low power consumption communication mode M13. In this low power consumption communication mode M13, the wireless communications of both sides are carried out intermittently by a cycle longer than a communication cycle in the data transfer mode M12 and it becomes a state in which the wireless connection between the both sides is maintained. Owing to the fact that the cycle carrying out the intermittent communication is long in this manner, it becomes possible to make the power consumption required for the communication smaller than a case in which it is operated in the data transfer mode M12 and low power consumption is realized. It should be noted that the low power consumption here indicates a phenomenon that the low power consumption is realized by thinning out communication cycles and is not related directly to the process for lowering the transmission power which will be described later on.

In a case when the data transfer between the both sides is to be restarted in a state of this low power consumption communication mode M13, it returns to the connection mode M11, a process for restarting the communication is carried out in the connection mode M11 and thereafter it becomes the data transfer mode M12 in which the data transfer is carried out practically. In a state in which the wireless connection is maintained in the low power consumption communication mode M13, the connection process in the connection mode M11 is carried out relatively simply and it is possible to carry out the restart of the data transfer rapidly as compared with a case in which the wireless connection is recommenced.

Also, in a case when a connection process with anyone of communication partners is not carried out in the connection mode M11 (or in a case when a connection is not possible), each apparatus is shifted to the standby mode M14. The apparatus which becomes this standby mode M14 carries out an intermittent reception or transmission with a very long cycle and carries out a process for searching whether or not a communication apparatus to become a partner exists. Here, it may be constituted such that the apparatus becoming the standby mode M14 does not return to the connection mode M11 if there is no process which may become some kind or another opportunity caused by a user operation or the like. Also, during a period when a communication is carried out between two apparatuses, the two apparatuses are to be set in the same mode basically. More specifically, at least the connection mode M11, the data transfer mode M12 and the low power consumption mode M13 are the modes which shift in synchronism with each other between the two apparatuses.

Here, in case of the present invention, as shown in FIG. 5, the normal mode M1 is set as a security mode when it is a state in which it communicated between the mobile telephone terminal apparatus 50 and the wireless key apparatus 1 in the low power consumption communication mode M13 and a warning mode is started by an opportunity that the communication mode shifts from the low power consumption communication mode M13 to the connection mode M11. The process with respect to the detail in which it is shifted from a warning mode to a function limitation mode will be described later on, but when the security mode becomes the function limitation mode M3, the function limitation mode M3 remains during a period when it is the connection mode M11, the data transfer mode M12 and the standby mode M14. It is constituted only in a case when it is shifted from the data transfer mode M12 to the low power consumption communication mode M13 such that the security mode is to return from the function limitation mode M3 to the normal mode M1.

According to the mode transition mentioned above, if, for example, a user puts on the wireless key apparatus 1 and goes away from the mobile telephone terminal apparatus 50 while only the mobile telephone terminal apparatus 50 is remained somewhere, the communication state becomes deteriorated according to a free space loss or the like, it becomes difficult to detect packets transmitted by the partner device, an abnormal cut off occurs finally and an instruction for applying a function limitation to the mobile telephone terminal apparatus 50 is carried out. It is possible according to that constitution to apply a function limitation to the mobile telephone terminal apparatus 50 when the wireless key apparatus 1 goes away from the mobile telephone terminal apparatus 50 by a constant distance. Further, it is possible to release the function limitation automatically in a case when a reconnection can be executed after the function limitation was applied. In this manner, it is possible for a user to operate a security function of the mobile telephone terminal without being conscious thereof.

In the present invention, in order to realize a highly accuracy distance detection between communication apparatuses which is indispensable in carrying out the above mentioned mode transition precisely, the following functions are provided in the respective communication terminal apparatuses which carries out the abovementioned security process, that is mobile, in the communication terminal apparatus 50 and in the mobile key apparatus 1 as explained in FIG. 2 partially:

1. Means for confirming (identifying proper distance) manually or automatically that the wireless key apparatus 1 and the mobile telephone terminal apparatus 50 exists in a normal mode in an appropriate distance such, for example, as in a point-blank range or the like.

2. Structure for communicating between the wireless key apparatus 1 and the mobile telephone terminal apparatus 50 that they are in an appropriate distance and a receiving state or a transmission power on the occasion thereof and for adjusting a parameter used for the distance detection.

3. In the aforementioned parameter adjustment, structure for heightening the adjustment accuracy by judging an error of the transmission path state (propagation loss) on the transmission side and the receiving side and by carrying out a re-reception of the wireless state.

In case of realizing the proper distance identification of aforementioned 1 manually, a user judgment is utilized and an input operation signal from the operation unit 12 of the mobile telephone terminal apparatus 50 or the wireless key apparatus 1 shown in FIG. 2 is used. In a case, for example, when the wireless key apparatus 1 is contained in a jacket breast pocket and the mobile telephone terminal apparatus 50 is contained in a mobile holder on a belt, a user first recognizes that both of them exist in the vicinity of his body and thereafter, for example, a predetermined button of the operation unit 12 in the wireless key apparatus 1 is pressed down so as to make it in a proper distance identification state.

Also, it is limited only in a normal mode when the proper distance identification process is carried out automatically and it is made to be in a proper distance identification state by detecting that the RSSI reception level or the like became stable after a predetermined time just after the power supply is made ON or after the normal key input of the mobile telephone terminal apparatus 50 (out going and incoming operation, E-mail transmission and reception operation or the like) is finished. This is a construction utilizing a habit that a user returns the mobile telephone terminal to a normal holding position just after a utilization end in a normal utilization.

In the present invention, the wireless key apparatus 1 and the mobile telephone terminal apparatus 50 are in a state which a communication is carried out at low speed in a normal mode for the sake of a connection maintaining confirmation (low power consumption communication mode).

Consequently, the following information is to be transmitted by utilizing that communication:

a) Transmission of proper distance identification information from the detected side to the partner device.

b) Transmission of a wireless state (receiving RSSI level or transmission power) from the detected side to the partner device.

c) Transmission of a wireless state from the partner device to the detected side.

Here, a) is a must, but b) and c) become necessary for carrying out a correction process in a case when the transmission power is different from that initially set.

Further, in order to carry out a specific explanation with respect to a distance detection parameter adjustment, parameters and condition of assumption relating to the wireless state are defined as mentioned below.

Suffix#n of a parameter described later on is supposed to be "1" in the wireless key and "2" in the mobile telephone terminal.

Initially transmission power is supposed to be Tx_ref#n, the transmission power at present on an occasion of a transmission power control to be Tx_#n and the value to be Tx_#n_adj after an adjustment in the detection parameter adjustment unit 8.

The receiving RSSI value is supposed to be RSSI_#n and the reference RSSI value when adjacent to be RSSI_ref#n.

With respect to distance detection threshold on the RSSI base, the initial value is supposed to be RSSI_th#n and the value after the adjustment in the detection parameter adjustment unit 8 to be RSSI_th#n_adj.

The unit of these parameter values is supposed to be [dBm] or [dB].

Initially transmission power of the partner device and the reference RSSI value are supposed to be known or finished being transmitted beforehand.

It will be described by using a receiving strength of RSSI system constituted as shown in FIG. 2 with respect to a case when a distance detection operation carried out. First, in a case when the power control is not carried out in either of the wireless key and the mobile telephone terminal, the adjustment of the detection parameter is possible only by aforementioned "a) Transmission of proper distance identification information". More specifically, it is enough to correct the distance detection threshold by the reference RSSI value when adjacent and the difference of the receiving RSSI value at present as follows:

Wireless key side: RSSI_th1_adj=RSSI_th1+(RSSI_1−RSSI_$_{ref}$1)

Mobile telephone terminal side:
RSSI_th2_adj=RSSI_th2+(RSSI_2−RSSI_ref2)

Next, in a case when one of the apparatuses which carry out the wireless communication is carrying out a power control and when it is assumed that the wireless key is carrying out a transmission power control and at the same time the wireless key carried out a proper distance identification, the abovementioned "a)Proper distance identification information" and "b) Transmission of wireless state information on the detection side" are carried out and thereafter, the following adjustments are carried out:

At that time, it is assumed that a change of the transmission power on the wireless key side is not carried out.

wireless key side: RSSI_th1_adj=RSSI_th1+(RSSI_1−RSSI_ref1)

mobile telephone terminal side:
RSSI_th2_adj=RSSI_th2+(RSSI_2−RSSI_ref2)+(Tx_1−Tx_ref1)

It should be noted that the abovementioned power control is a control utilizing a function controlling a transmission power which is mounted on the Bluetooth standard. In this case, a correction process in a case when the transmission power of the wireless key apparatus 1 is different from that of initially assumed is carried out and a receiving RSSI value of the mobile telephone terminal apparatus 50 is adjusted by using information from the wireless key apparatus 1.

Further, the propagation loss for the transmission and the reception can be calculated in the mobile telephone terminal apparatus 50, so that the detection relating to a measurement error of the receiving RSSI value RSSI_2 is possible. There is a relation as follows:

(propagation loss)=Tx_1−RSSI_2=Tx_2−RSSI_1

According to the relation above, in a case when the error between the receiving RSSI value RSSI_2 and the value (RSS_1+Tx_1−Tx_2) on the side of the mobile telephone terminal apparatus 50 is big, an operation for transmitting a wireless state each other is carried out once again so as to make it possible to heighten the adjustment accuracy.

Further, in a case when the both which carry out the wireless communication are carrying out the power control, it is necessary also for the detection receiving side to carry out "c) Transmission of wireless state information" with respect to abovementioned "a)Proper distance identification information" and "b) Transmission of wireless state information on the detection side"

At that time, it becomes an adjustment value as below. In the adjustment, it is assumed that change of the transmission power on the both sides is not carried out.

Wireless key side: RSSI_th1_adj=RSSI_th1+(RSSI_1−RSSI_ref1)+(Tx_2−Tx_ref2)

Mobile telephone terminal side:
RSSI_th2_adj=RSSI_th2+(RSSI_2−RSSI_ref2)+(Tx_1−Tx_ref1)

Similarly, according to the relation of the abovementioned transmission loss calculation, it is possible to heighten adjustment accuracy degree by comparing the errors of the receiving RSSI value RSSI_1 and (RSS_2+Tx_2−Tx_1) value on the side of the wireless key apparatus 1 and by carrying out an operation that the wireless state information is transmitted each other.

It should be noted in the abovementioned example that it is not limited to one by one wireless state transmission and it is possible to adjust by heightening the accuracy of the RSSI value according to the result of several times of transmissions. Also, also in a case when the transmission power control is not carried out, it becomes possible to improve the accuracy by the measurement accuracy confirmation of the RSSI value or re-measurement owing to a constitution in which both of the wireless states are transmitted each other.

Figure 6A:
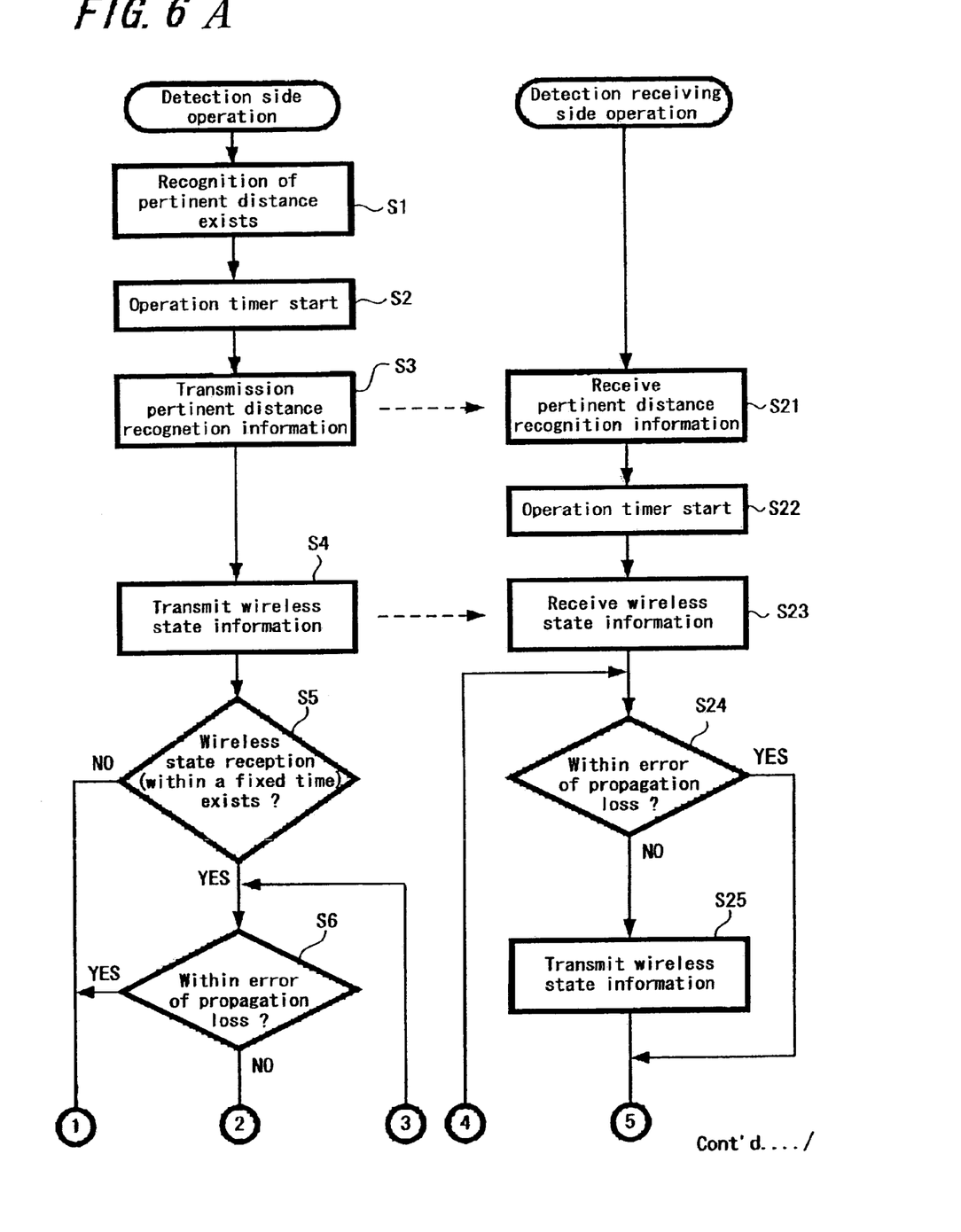
FIG. 6 is a flowchart (1) showing a wireless state information retransmission process by an error detection of propagation loss according to one exemplified embodiment of the present invention.
Figure 6B:
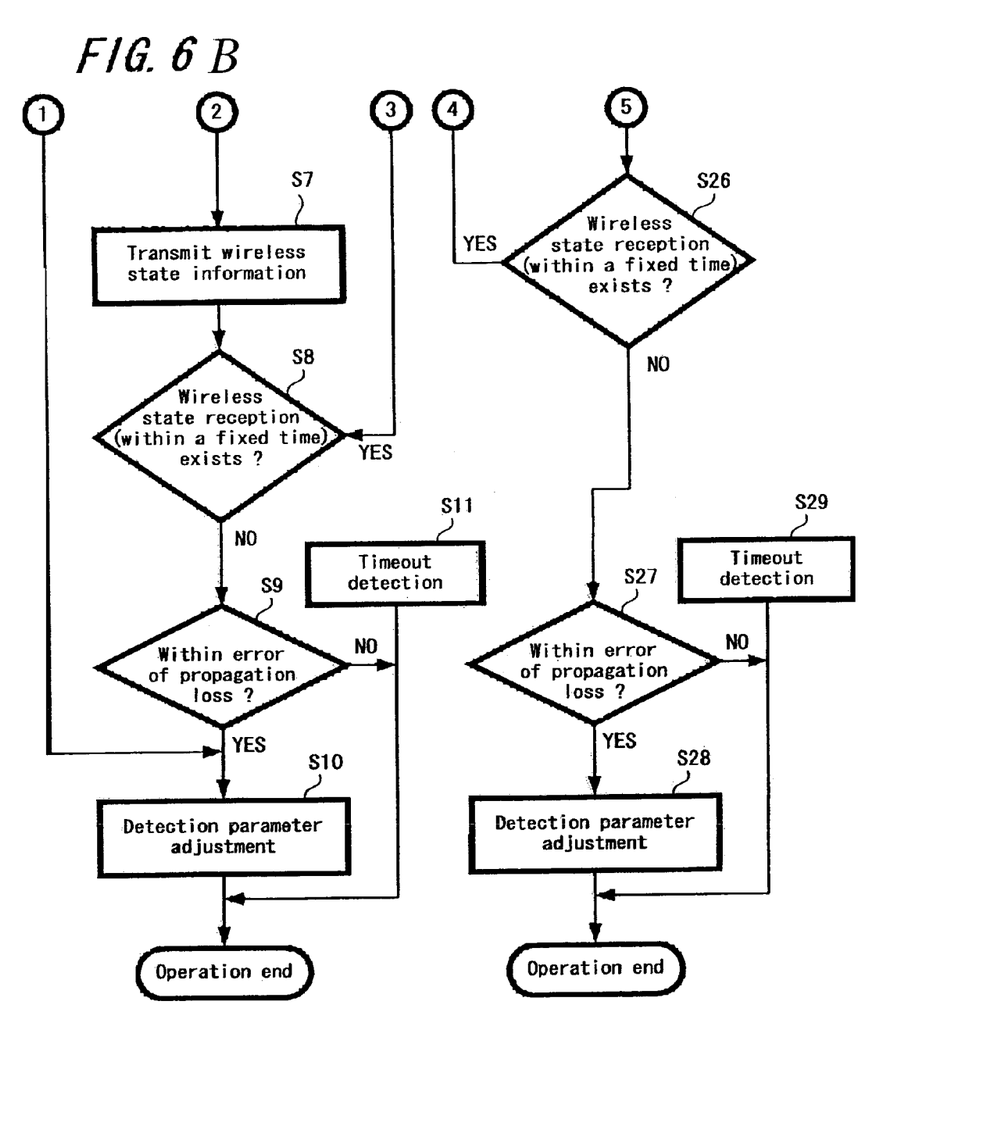

FIG. 6 shows a retransmission process flowchart (1) of wireless state information according to an error detection of a propagation loss and is made to be an example (corresponding to abovementioned a), b)) in which a proper distance identification is carried out firstly and at the same time, wireless state information is transmitted from the detection side. In this example it is assumed that the wireless key apparatus 1 is to be a detection side and the mobile telephone terminal apparatus 50 is to be a detection receiving side and it will be explained with respect to a case in which wireless state information is exchanged mutually, but is should be noted that it becomes similar if the wireless key apparatus 1 and the mobile telephone terminal apparatus 50 are counterchanged.

In FIG. 6 first, a user confirms that the wireless key of the detection side and the mobile telephone terminal apparatus 50 of the detection receiving side exist nearby and thereafter carries out a predetermined operation with respect to the operation unit 12, and the wireless key apparatus 1 receives the operation signal from the operation unit 12 and recognizes that it is in a proper distance (point-blank range) with the mobile telephone terminal apparatus 50 of the connection partner (step S1) and at the same time, an operation timer which is not shown starts (step S2). Then, proper distance identification information designating that it is in a proper distance from the wireless key side is sent (step S3). In the mobile telephone terminal apparatus 50 on the detection receiving side receives the proper distance identification information from the wireless key apparatus 1 (step S21) and an operation timer which is not shown starts (step S22). These operation timers are utilized for the purpose of observing whether or not the propagation loss which will be described later on is adjusted within an error region in a predetermined time period and time period from the timer start until a predetermined time period elapses is set suitably. Further, the wireless key sends wireless state information of such as a receiving RSSI value, transmission power or the like (step S4) and in the mobile telephone terminal apparatus 50, the wireless state information from the wireless key apparatus 1 is received (step S23).

It should be noted in a case when the power control is not carried out that an adjustment of distance detection threshold on the RSSI base is carried out in both of the wireless key apparatus 1 and mobile telephone terminal apparatus 50 according only to a sending process (step S1, S3, S21) of the proper distance identification information from the wireless key apparatus 1 to the mobile telephone terminal apparatus 50 as mentioned above.

Then, the wireless key apparatus 1 judges whether or not there exists wireless state information reception from the mobile telephone terminal apparatus 50 (step S5) and if there is no wireless state information reception within a predetermined time period, detection parameter adjustment is carried out (step S10) and the operation is ended.

On the other hand, in a case when there exists wireless state information reception, the propagation loss is calculated in the detection parameter adjustment unit 8 by using the received wireless state information and it is judged whether or not the propagation loss is within a predetermined error region (step S6), and if it is within the error region, an adjustment of the detection parameter is carried out (step S10) and the operation is ended.

In the aforementioned judgment step S6, in a case when it is not within the error region, wireless state information is sent once again with respect to the mobile telephone terminal apparatus 50 (step S7) and thereafter, it is judged whether or not a response with respect to the sent wireless state information, in other words, the wireless state information reception from the mobile telephone terminal apparatus 50 exists within a predetermined time period (step S8). In this judgment step S8, in a case when there exists wireless state information reception, the flow is shifted to step S6 and on the other hand, in a case when the reception does not exist, the propagation loss is calculated once again and it is judged whether or not the propagation loss is within the error region (step S9).

In the judgment step S9, if the propagation loss is within the error region, an adjustment of the detection parameter is carried out (step S10) and the operation is ended. Also, in a case when the propagation loss is not within the error region, the detection of the elapsed time period of the abovementioned operation timer (step S11) is received and the operation is ended.

On the other hand, in the mobile telephone terminal apparatus 50 on the detection receiving side calculates the propagation loss in the detection parameter adjustment unit 8 by using the wireless state information received from the wireless key apparatus 1 and it is judged whether or not the calculated propagation loss is within the error region (step S24), and if it is within the error region, the flow is shifted to judgment step S26. Also, in a case when it is not within the error region, wireless state information is sent with respect to the wireless key apparatus 1 (step S25) and thereafter, it is judged whether or not a response with respect to the sent wireless state information, in other words, the wireless state information reception from the wireless key is within a predetermined time period (step S26). In this judgment step S26, in a case when there was wireless state information reception, the flow is shifted to step S24, the propagation loss is calculated once again according to the received information and it is judged once again whether or not the propagation loss is within the error region.

In the abovementioned judgment step S26, in a case when there is no wireless state information reception, it is judged whether or not the propagation loss is within the error region (step S27) and if, the propagation loss is within the error region, an adjustment of the detection parameter is carried out (step S28) and the operation is ended. Also, in a case when the propagation loss is not within the error region, the detection of the elapsed time period of the abovementioned operation timer (step S29) is received and the operation is ended.

It should be noted in step S6 and S9 and in step S25 and S27 that in a case when the error of the propagation loss is too big, it may be constituted such that the measurement environment is assumed to be different, the wireless state information transmitted and received between the wireless key apparatus 1 and the mobile telephone terminal apparatus 50 is made invalid and the exchange of the wireless state information is to be carried out once again. Alternatively, it may be constituted such that the detection parameter adjustment processes are to be recommenced from the proper distance identification in step S1.

As mentioned above, it is constituted in FIG. 6 such that transmission and reception of the wireless state information are carried out when the error of the propagation loss is big. More specifically, the detection receiving side transmits wireless state information to the detection side when the error of the propagation loss is big and the propagation loss is recalculated by receiving a return mail of the wireless state information from the detection side. On the other hand, on the detection side, reception of the wireless state information from the detection receiving side is waited for and if there is no reception, an adjustment of the detection parameter is carried out thereafter as it is and the operation is ended, but if there is reception, the propagation loss is calculated according to the information. Then, when the error of the propagation loss is big, the wireless state information is sent once again to the detection receiving side and the propagation loss is calculated again after waiting for its return mail. By carrying out these processes in a predetermined time period, it is possible to judge the error of the receiving RSSI value and if the error is big, it is possible by promoting a re-measurement to approach to an ideal state in which losses in the apparatuses on the detection side and the detection receiving side are corrected.

Figure 7A:
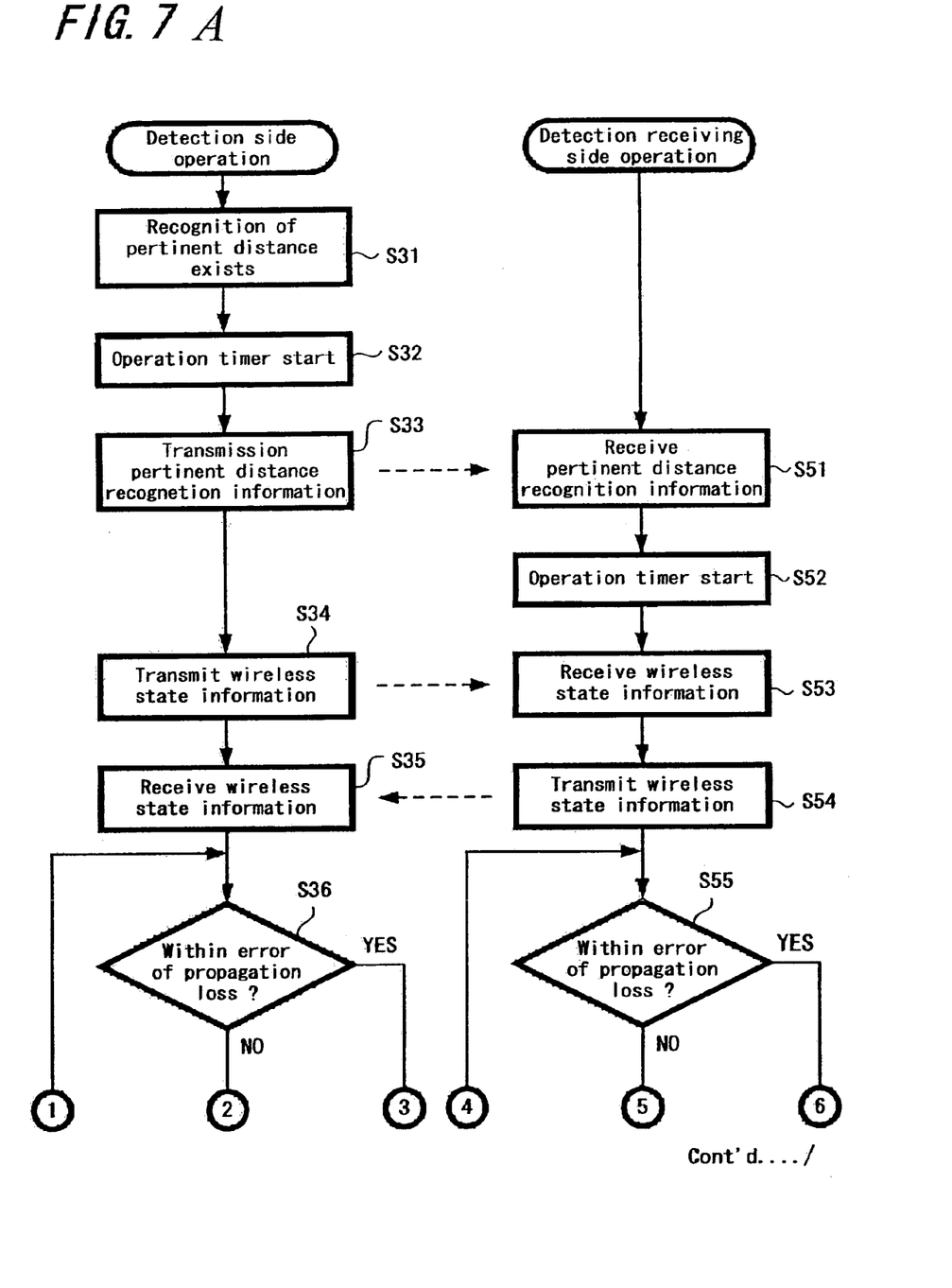
FIG. 7 is a flowchart (2) showing a wireless state information retransmission process by an error detection of propagation loss according to one exemplified embodiment of the present invention.
Figure 7B:
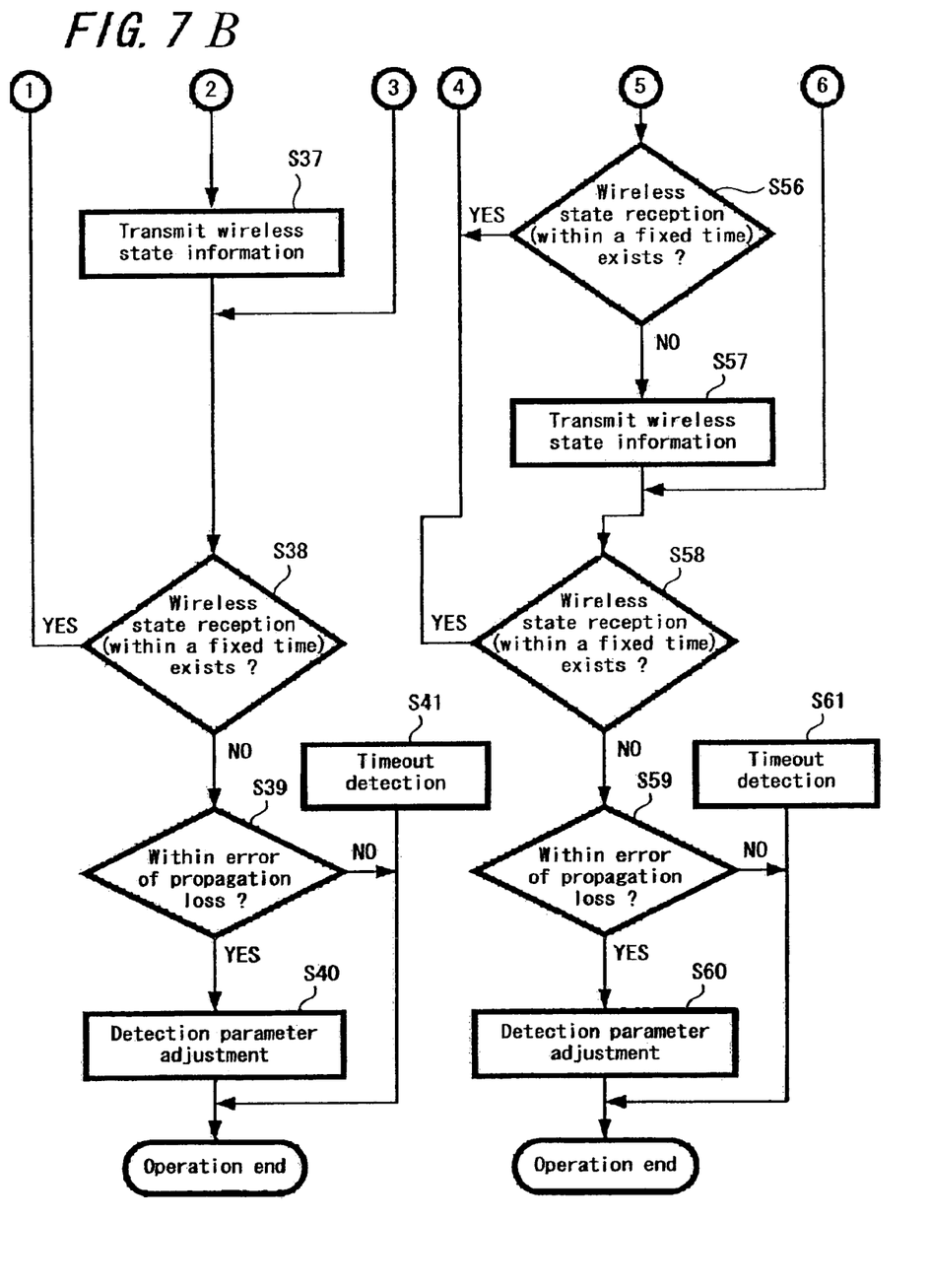

FIG. 7 shows a retransmission process flowchart (2) of wireless state information by an error detection of a propagation loss, and it is made to be an example (corresponding to abovementioned a), b), c)) in which firstly, a proper distance identification is carried out and thereafter, wireless state information is transmitted from the detection side and at the same time, wireless state information is sent back to the detection side also from the detection receiving side. Also in this example similarly as the example in FIG. 4, it is assumed that the wireless key apparatus 1 is the detection side and the mobile telephone terminal apparatus 50 is the detection receiving side and it will be explained with respect to a case in which the wireless state information is exchanged mutually where it is possible to counterchange the wireless key apparatus and the mobile telephone terminal apparatus.

In FIG. 7 first, similarly as steps S1 to S4 and steps S21 to S23 in FIG. 6, respective processes of proper distance identification, proper distance identification information transmission with respect to the mobile telephone terminal 50 of the detection receiving side from the wireless key of the detection side, respective operation timers starts of the wireless key apparatus 1 and the mobile telephone terminal apparatus 50 and wireless state information transmission from the wireless key apparatus 1 to the mobile telephone terminal apparatus 50 are carried out (steps S31 to S34 and steps S51 to S53). When the mobile telephone terminal apparatus 50 receives wireless state information from the wireless key apparatus 1, it transmits the wireless state information of the mobile telephone terminal apparatus 50 with respect to the wireless key (step S54) and the wireless state information from this mobile telephone terminal apparatus 50 is received by the wireless key apparatus 1 (step S35).

Then, in the wireless key apparatus 1, propagation loss is calculated in the detection parameter adjustment unit 8 by using the received wireless state information, it is judged whether or not the calculated propagation loss is within an error region (step S36) and if it is within an error region the flow is shifted to judgment step S38. Also, in a case when it is not within the error region, the wireless state information is transmitted once again with respect to the mobile telephone terminal apparatus 50 (step S37) and thereafter, it is judged whether or not a response with respect to the transmitted wireless state information, in other words, the wireless state information reception from the mobile telephone terminal is within a predetermined time period (step S38). In this judgment step S38, in a case when there is a reception, the propagation loss is calculated once again according to the information received by shifting to step S36 and it is judged once again whether or not the propagation loss is within the error region.

In a case in the judgment abovementioned step S38 when there is no wireless state information reception, it is judged whether or not the propagation loss calculated already is within the error region (step S39) and if the propagation loss is within the error region, an adjustment of the detection parameter is carried out (step S40) and the operation is ended. Also, in a case when the propagation loss is not within the error region, the detection of the time period elapse of the abovementioned operation timer (step S41) is received and the operation is ended.

In the mobile telephone terminal apparatus 50 of the detection receiving side on the other side, a propagation loss is calculated in the detection parameter adjustment unit 8 by using the wireless state information received from the wireless key apparatus 1 and it is judged whether or not the calculated propagation loss is within the error region (step S55) and if it is within the error region, the flow is shifted to judgment step S58. Also, in a case when it is not within the error region, it is judged whether or not there was a new wireless state information reception from the wireless key within a predetermined time period (step S56). That is to say, the flow is constituted such that the initial retransmission from the detection side (corresponding to step S37) is waited for once by the detection receiving side.

In a case in this step S56 when the wireless state information from the wireless key apparatus 1 is received, the flow is shifted to judgment step S55 and the propagation loss is calculated once again according to the received wireless state information. Also, in a case when the wireless state information was not received, wireless state information is transmitted with respect to the wireless key apparatus 1 (step S57). Then, it is judged whether or not there was wireless state information reception from the wireless key apparatus 1 within a predetermined time period (step S58). It should be noted in a case when the wireless state information was transmitted in step S57 that the flow is expected basically to receive by a wireless state reception judging process on the detection side (step S8), but in a case when a timeout detection of the operation timer occurs, the process is skipped exceptionally and the sequential operations are to be ended.

In a case in this judgment step S58 when there was no wireless state information reception within a predetermined time period, it is judged whether or not the propagation loss is within the error region under the condition at present (step S59) and if the propagation loss is within the error region, an adjustment of the detection parameter is carried out (step S60) and the operation is ended. Also, in a case when the propagation loss is not within the error region, detection of time period elapse of the abovementioned operation timer is received (step S61) and the operation is ended.

It should be noted in step S36 and step S55 that it may be constituted in a case when the error of the propagation loss is too big such that the measurement environment is supposed to be different and the wireless state information transmitted and received between the wireless key apparatus 1 and the mobile telephone terminal apparatus 50 is made to be invalid so as to carry out exchange of the wireless state information once again. Alternatively, it may be constituted such that the detection parameter adjustment processes are to be recommenced from the proper distance identification in step S31.

As mentioned above, the detection side transmits the wireless state information to the detection receiving side when the propagation loss error is big and the propagation loss is recalculated after receiving the return mail. On the other hand, the detection receiving side waits for wireless state information reception from the detection side when the propagation loss error is big and alternatively, when there is no reception, wireless state information is transmitted with respect to the detection side from the detection receiving side. Then, the propagation loss is recalculated after receiving a return mail with respect to the reception or the transmission. Consequently, in FIG. 7 similarly as in FIG. 6, the error of the receiving RSSI value can be judged by carrying out these processed in a predetermined time period and by promoting re-measurement if the error is big, it is possible to approach to an ideal state in which losses in the apparatuses on the detection side and the detection receiving side are corrected.

According to the above mentioned exemplified embodiment, it is possible to realize a proper distance detection automatically and more simply in consideration of a simple manual operation in an actual operation or stability of a reception state after a predetermined time period elapse after a normal use. Also, in a parameter adjustment of distance detection after proper distance detection, it is possible to purpose improvement in adjustment accuracy of the detection parameter by carrying out bidirectional propagation loss comparison, by carrying out error judgment of the RSSI value in the receiving signal and by promoting re-measurement in response to its result.

Consequently, even if the wireless key apparatus 1 and the mobile telephone terminal apparatus 50 are utilized in various kinds of possessing states, it is possible to make the detection distance to be constant in both the apparatuses, so that it is possible to execute function limitation, warning or the like with respect to the mobile telephone terminal apparatus 50 more precisely and reliably.

Figure 8:
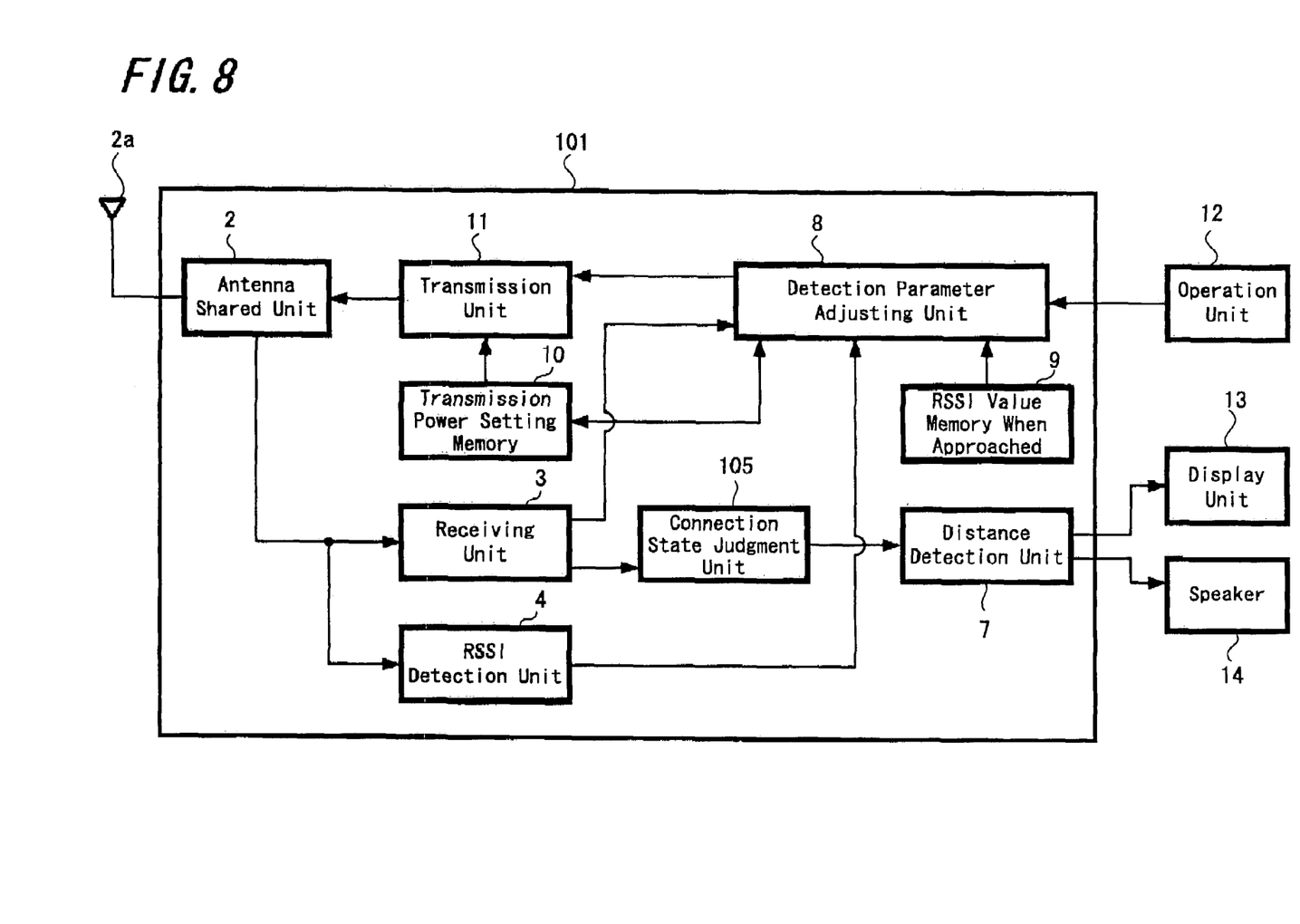
FIG. 8 is a function block diagram of a wireless key and a mobile telephone terminal apparatus using a connection state detection according to another exemplified embodiment of the present invention.

Next, it will be explained with respect to another exemplified embodiment of the present invention with reference to FIG. 8. FIG. 8 shows a function block diagram of a wireless key apparatus and a mobile telephone terminal apparatus in which receiving signal strength is judged by connection/cutoff of a communication and a distance detection operation is carried out.

The point of difference in FIG. 8 compared with FIG. 2 lies in that a connection state judgment unit 105 is provided instead of the RSSI value comparison unit 5 and the detection threshold memory 6 in FIG. 2. The receiving signal from the receiving unit 3 is inputted to a connection state judgment unit 105 and its judgment result is outputted to the distance detection unit 7. Also, an output of the RSSI detection unit 4 is inputted to the detection parameter adjustment unit 8. The connection state judgment unit 105 judges as "connection" if a connection with the communication partner is establish and in a case when the connection cannot be establish beyond a time period of a certain threshold, it is judged that it is cut off. Then, in the distance detection unit 7, a value which is set beforehand corresponding to connection/cutoff which was judged in the connection state judgment unit 105 is detected as a distance between the wireless key apparatus 1 and the mobile telephone terminal apparatus 50.

In a case in this example when the power control is carried out in both of the apparatuses which carry out a wireless communication, information transmission processes relating to the abovementioned "a) Proper distance identification", "b) Wireless state information of the detection side" and "c) Wireless state information on the detection receiving side" are performed and thereafter, the following power adjustments are carried out:

Wireless key side: Tx_1_adj=Tx_1−(RSSI_2−RSSI_ref2)

Mobile telephone terminal side: Tx_2_adj=Tx_2−(RSSI_1−RSSI_ref1)

In the example of FIG. 8, it is constituted such that the adjustment of the distance detection is carried out according to the change of the transmission power so as to improve detection accuracy of the distance between the wireless key apparatus 1 and the mobile telephone terminal apparatus 50. Also, it is possible similarly as the example in FIG. 2 to calculate the propagation loss on the detection side and the detection receiving side by transmitting and receiving the wireless state information mutually, so that in a case when the error is big, it is assumed that there is the receiving RSSI value error and the wireless state information of the both apparatuses is exchanged once again so as to make it possible to heighten the accuracy of the detection parameter adjustment. With respect others, similar operation effects as the example in FIG. 2 are to be presented.

According to the present invention, it was constituted such that the parameter relating to the distance detection is adjusted by a simple operation or by an automatic detection, so that accuracy improvement of the distance detection between two of the communication terminal apparatuses can be attempted and as a result, there is an effect in which even if two of the communication terminal apparatuses are utilized in various kinds of holding states, they can be detected by a constant distance.

Also, in a parameter adjustment relating to distance detection after a proper distance identification of the present invention, there is an effect that improvement in adjustment accuracy of the aforesaid parameter can be attempted if the bidirectional propagation loss for the reception and the transmission is calculated after the wireless state of the communication terminal apparatus on a occasion of a proper distance identification is communicated, error judgment of the receiving strength is carried out and as the result of the judgment, re-measurement is promoted if it is necessary.

It should be noted that the present invention is not limited to the abovementioned exemplified embodiments, it is possible to apply the present invention to various kinds of communication terminal apparatuses other than the mobile telephone terminal apparatus such as, for example, to a mobile information terminal (PDA), mobile type personal computer or the like and it is needless to say that other various kinds of constitutions can be adapted without departing from the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A communication terminal apparatus which detects a distance with respect to a connection partner apparatus and limits a predetermined function or notifies that fact thereof to a user in a case when the distance exceeds a predetermined value comprising:
   communication means for carrying out a wireless communication with a connection partner apparatus by a predetermined wireless communication system;
   distance detection means for carrying out a distance detection according to a parameter relating to the detection of the distance with respect to said connection partner apparatus;
   proper distance recognition means for obtaining an information signal to the effect that the distance with respect to said connection partner apparatus is in a predetermined proper distance and for recognizing that it is in a proper distance with respect to said connection partner apparatus; and
   adjustment means for adjusting said parameter value according to said parameter value when said proper distance recognition means recognized that it is in a proper distance with respect to said connection partner apparatus and said parameter reference value in said proper distance,
   wherein when a distance with respect to said connection partner apparatus is a predetermined proper distance, the propagation loss is calculated by receiving wireless state information including information of receiving strength and transmission power from said connection partner appartus;
   the process for recalculating said propagation loss according to the wireless state information sent back from said connection partner apparatus is repeated for a predetermined time period until said propagation loss error falls into a predetermined range; and
   when said propagation loss error is within a predetermined range, said parameter adjustment is carried out.

2. A communication terminal apparatus according to claim 1, wherein the adjustment of said parameter is carried out when said proper distance recognition means recognizes said proper distance after a user carries out a predetermined operation with respect to said operation unit.

3. A communication terminal apparatus according to claim 1, wherein said parameter is a receiving strength or a transmission power.

4. A communication terminal system which detects a distance between a first and a second communication terminal apparatuses and limits a predetermined function of a predetermined one of said first and second communication terminal apparatuses and/or notifies that fact thereof to a user in a case when the distance exceeds a predetermined value, wherein each of said first and second communication terminal apparatuses comprises:
   an operation unit, communication means for carrying out a wireless communication with said connection partner apparatus by a predetermined wireless communication system;
   distance detection means for carrying out a distance detection according to a parameter relating to the detection of the distance with respect to said connection partner apparatus, proper distance recognition means for obtaining an information signal to the effect that the distance with respect to said connection partner apparatus is in a predetermined proper distance and for recognizing that it is in a proper distance with respect to said connection partner apparatus, and adjustment means for adjusting said parameter value according to said parameter value when said proper distance recognition means recognized that it is in a proper distance with respect to said connection partner apparatus and said parameter reference value in said proper distance; and
   after a user carries out a predetermined operation to said operation unit with respect to said first or second communication terminal apparatus, said proper distance recognition means recognizes said proper distance and proper distance recognition information is transmitted to the connection partner apparatus, so that an adjustment of said parameter is to be carried out in said first and second communication terminal apparatuses,
   wherein when a distance with respect to said connection partner apparatus is a predetermined proper distance, the propagation loss is calculated by receiving wireless state information including information of receiving strength and transmission power from said connection partner apparatus;
   the process for recalculating said propagation loss according to the wireless state information sent back from said connection partner apparatus is repeated for a predetermined time period until said propagation loss error falls into a predetermined range; and
   when said propagation loss error is within a predetermined range, said parameter adjustment is carried out.

5. A method in which a distance with respect to a connection partner apparatus is detected and a predetermined function is limited or that fact thereof is notified to a user in a case when the distance exceeds a predetermined value comprising the steps of:
   carrying out a wireless communication with a connection partner apparatus by a predetermined wireless communication system;

carrying out a distance detection according to a parameter relating to the detection of the distance with respect to said connection partner apparatus;

obtaining an information signal to the effect that the distance with respect to said connection partner apparatus is in a predetermined proper distance and recognizing that it is in a proper distance with respect to said connection partner apparatus; and adjusting said parameter value according to said parameter value when it is recognized that it is in a proper distance with respect to said connection partner apparatus said parameter reference value in said proper distance, wherein when a distance with respect to said connection partner apparatus is a predetermined proper distance, the propagation loss is calculated by receiving wireless state information including information of receiving strength and transmission power from said connection partner apparatus;

the process for recalculating said propagation loss according to the wireless state information sent back from said connection partner apparatus is repeated for a predetermined time period until said propagation loss error falls into a predetermined range; and when said propagation loss error is within a predetermined range, said parameter adjustment is carried out.

* * * * *